(12) United States Patent
Leclair et al.

(10) Patent No.: US 11,876,766 B2
(45) Date of Patent: Jan. 16, 2024

(54) GENERATING AND PRESENTING NOISE RANKINGS FOR MESSAGES FROM A SENDER

(71) Applicant: Microsoft Technology Licensing, LLC, Redmond, WA (US)

(72) Inventors: Daniel Steven Leclair, Kenmore, WA (US); Joseph Truman Flint, Redmond, WA (US); Vanessa Samantha Lann, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/749,093

(22) Filed: May 19, 2022

(65) Prior Publication Data

US 2023/0412548 A1  Dec. 21, 2023

(51) Int. Cl.
*H04L 51/212* (2022.01)
*H04L 51/42* (2022.01)
*H04L 51/046* (2022.01)

(52) U.S. Cl.
CPC ......... *H04L 51/212* (2022.05); *H04L 51/046* (2013.01); *H04L 51/42* (2022.05)

(58) Field of Classification Search
CPC ...................................................... H04L 51/21
See application file for complete search history.

(56) References Cited

U.S. PATENT DOCUMENTS

| | | | |
|---|---|---|---|
| 7,761,567 B2 | 7/2010 | Haverkos | |
| 8,140,540 B2 | 3/2012 | Chitiveli et al. | |
| 8,918,473 B1 * | 12/2014 | O'Connor | G06Q 10/107 709/206 |
| 9,596,202 B1 | 3/2017 | Beach et al. | |
| 10,681,140 B2 | 6/2020 | Gupta et al. | |
| 10,897,444 B2 | 1/2021 | Raviv et al. | |
| 11,216,500 B1 | 1/2022 | Ongan et al. | |
| 2005/0021649 A1 * | 1/2005 | Goodman | H04L 51/212 709/207 |
| 2013/0018964 A1 * | 1/2013 | Osipkov | H04L 67/306 709/206 |
| 2016/0098745 A1 | 4/2016 | Adams et al. | |
| 2018/0314761 A1 | 11/2018 | Lewin-eytan et al. | |
| 2019/0044903 A1 * | 2/2019 | Gulik | H04L 51/42 |
| 2019/0199745 A1 * | 6/2019 | Jakobsson | H04L 63/1483 |
| 2020/0184511 A1 | 6/2020 | Goenka et al. | |

FOREIGN PATENT DOCUMENTS

CN   105007218 A   10/2015

OTHER PUBLICATIONS

Ferndz, Joe, "Pandas DF—Group by Sender, Calculate "Frequency" of Emails", Retrieved From: https://stackoverflow.com/questions/66202209/pandas-df-group-by-sender-calculate-frequency-of-emails, Feb. 15, 2021, 4 Pages.

* cited by examiner

*Primary Examiner* — Caroline H Jahnige
(74) *Attorney, Agent, or Firm* — Ray Quinney & Nebeker; James Bullough

(57) ABSTRACT

A noise management system analyzes messages from a sender to a plurality of recipients. The noise management system prepares a message frequency of a quantity of messages sent to a unique recipient over a period of time. The noise management system sends the message frequency with a noise rank to the client device for the recipient to review.

20 Claims, 14 Drawing Sheets

US 11,876,766 B2

GENERATING AND PRESENTING NOISE RANKINGS FOR MESSAGES FROM A SENDER

BACKGROUND

Recent years have seen significant improvements in communication technologies. For example, companies, individuals, and other entities may send electronic messages to many recipients, including advertisements, promotions, information, and order information. Some senders may send multiple messages over a period of time. Consumers often experience frustration regarding the number of messages they receive, particularly where certain senders are sending more messages than are desired. This excessive number of messages can clutter an inbox, reduce quantity of available storage space, and ultimately cause a recipient to become frustrated with particular senders and/or a message provider. In an effort to reduce inbox clutter, many messaging systems have employed filters or blocking mechanisms to limit the number of messages presented to a user. For example, blocks and filters may prevent messages from being viewed by the user. In some examples, filters may organize messages into folders or other organizational groups.

Although conventional systems can filter and/or organize incoming messages, such systems have a number of problems in relation to accuracy, efficiency, and flexibility of operation. For instance, filtering or sorting emails is often an inefficient use of resources, and typically involves processing and storing of messages that may be undesired or unread. This may exacerbate storage issues, such as when an email provider limits a quantity of storage space for an individual account holder.

In some situations, filtering or sorting emails is inflexible and/or lacks scalability. For example, where an individual may wish to filter certain messages from a sender, they may not wish to filter all messages from a sender. As another example, a user may wish to filter some types of messages generally, but not necessarily restrict messages on a sender-by-sender basis. Moreover, many individuals become frustrated when they have to add filtering rules on a message-by-message or sender-by-sender basis, particularly where the number of sender entities continues to grow as the number and variety of electronic messages also grows. Furthermore, conventional message filters are often over inclusive or underinclusive in the messages that are prevented from being delivered.

These and other problems exist with message filtering systems, and particularly in connection with electronic messaging systems.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 4-1 is a representation of a client device presenting messages on a GUI, according to at least one embodiment of the present disclosure;

FIG. 4-2 is a representation of the client device of FIG. 4-1 presenting frequency rating metrics of a sender;

FIG. 4-3 is a representation of the client device of FIG. 4-1 presenting frequency rating metrics of a sender;

FIG. 4-4 is a representation of the client device of FIG. 4-1 presenting frequency rating metrics of a sender;

FIG. 5-1 is a representation of a client device presenting messages on a GUI, according to at least one embodiment of the present disclosure;

FIG. 5-2 is a representation of the client device of FIG. 5-1 presenting frequency rating metrics of a sender;

FIG. 5-3 is a representation of the client device of FIG. 5-1 presenting frequency rating metrics of a sender;

DETAILED DESCRIPTION

Figure 1:
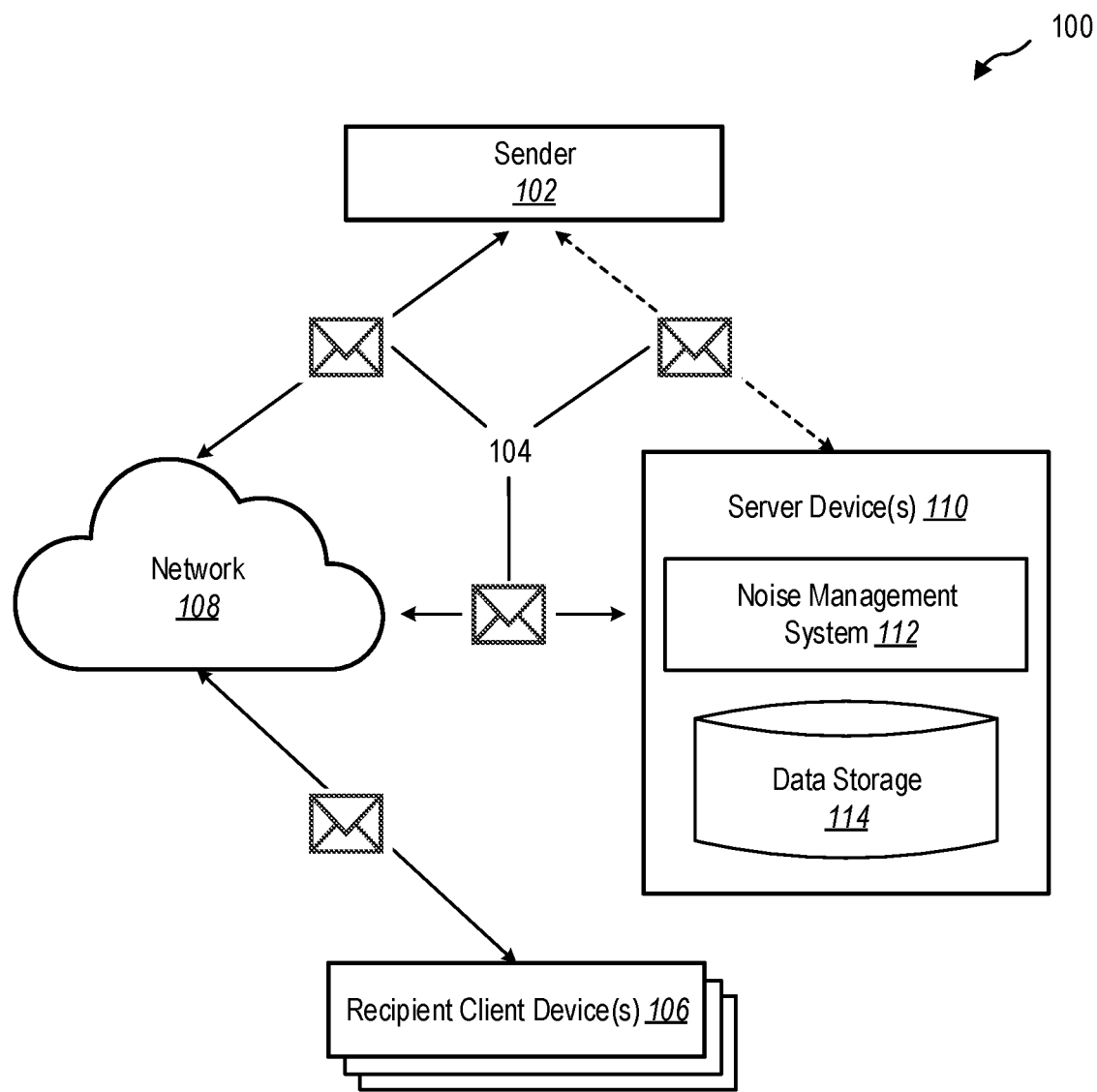
FIG. 1 is a representation of a messaging environment, according to at least one embodiment of the present disclosure.

This disclosure generally relates to devices, systems, methods, and computer readable media for facilitating message management based on a message noise level associated with a sender(s). As will be discussed herein, a message server (e.g., a noise management system on a message server) may review messages between a sender and recipients. For instance, the message server may determine a message frequency from a sender, which may include the number of messages that are sent to a unique recipient over a period of time. The message server may provide an indication of the message frequency to a recipient. The client device of the recipient may provide a presentation indicating a metric of message frequency and other frequency rating metrics of the sender. This may allow the message server and/or client device to predict how many messages a user account may expect to receive from the sender.

The present disclosure includes a number of practical applications that provide benefits and/or solve problems associated with managing clutter and reducing noise in various message folders (e.g., email inboxes). Some non-limiting examples of these benefits will be discussed in further detail below. For example, by determining message frequency rating metric(s) for a particular sender, a noise management system may accurately predict a number of messages a sender would be expected to send a recipient over a period of time. This accurate prediction may enable a user to manage delivery of messages more efficiently to a given message folder. As will be discussed in further detail below, the noise management system may allow a message server to manage messages based on this predicted frequency of messages sent from a given user, in addition to conventional filtering techniques.

In accordance with at least one embodiment of the present disclosure, the noise management system may allow a recipient to manage messages based on a predicted amount of noise of a particular brand. For example, while a recipient may desire the content of messages from the brand, the recipient may not desire the volume of messages from the brand. The noise of the sender may drown out the content of the messages. The noise management system may provide a value for how noisy the sender is, thereby allowing the recipient to limit delivery of messages from the sender. By filtering messages based on more than message content, the noise management system may improve the flexibility of operation of messaging systems.

The noise management system may further enhance incoming message analysis. For example, the noise management system may determine how many different emails are being sent to different recipients (e.g., subscribing recipients). In some embodiments, the noise management system may consider this predicted message frequency as an alternative (or precursor) to reviewing the message for content, thus reducing the amount of content that the message server needs to review in filtering messages to a given recipient. This enhanced analysis may improve processing efficiency and reduce memory utilization on a message server and/or on a client device.

In addition to more efficiently screening and filtering electronic messages, features and functionality of the noise management system can further reduce clutter within a given message folder, such as an inbox, by reducing a number of messages that are delivered for senders that are associated with high message frequency. This reduction of clutter allows for more important messages to be seen and viewed by a recipient. In addition, where inboxes and other folders often have data limits, this selective filtering of high-volume senders can have a significant effect on the amount of storage space that is kept available for various recipients. Moreover, where a message server is privately owned or internally managed, this can significantly reduce administrative costs associated with data cleaning and managing storage space.

In addition, reducing noise and clutter in a message inbox or messaging interface is a welcome development in the field of electronic messaging. Indeed, where recipients are often receiving hundreds of emails and messages every day, a significant amount of time is spent sifting through undesired emails and messages. Considering a large part of this is caused by high-frequency senders, the noise management system provides a welcome set of features and functionality that further improves the user experience with regard to navigating and viewing messages within a messaging interface.

As illustrated by the foregoing discussion, the present disclosure utilizes a variety of terms to describe features and advantages of the noise management system. Additional detail is now provided regarding the meaning of such terms. For example, as used herein, the term "message" refers to any electronic communication sent by a sender to a receiver. In particular, the term "message" can include any type of electronic message having a sender identifiable by a sender identifier (e.g., a sending address, a domain, or any other unique identifier associated with the sender) and a receiver identifiable by a receiver identifier (e.g., a receiving address, a receiver domain, an IP address, or any other unique recipient identifier). To illustrate, a message can include any type of electronic message, including email, text message, SMS, instant message, any other type of message, and combinations thereof.

As used herein, the term "sender" refers to a source or originator of a message. For example, a sender may refer to an individual, organization, or other entity that sent an electronic message, such as an email or instant message. In some embodiments, the sender may refer to a single entity. In some embodiments, the sender may include multiple related entities. For example, a sender may refer to multiple addresses of a particular domain (or set of related domains) or multiple accounts associated with the same organization. In some embodiments, the sender may refer to an email address, a telephone number, a social medial handle, an identification number, or other identifier. In one or more implementations, a sender may refer to a combination of addresses, numbers, handles, or other related identifiers. In some embodiments, the sender may include a group of identifiers. In some embodiments, the sender may include all addresses from a domain (or set of related domains determined to be associated with a common sender entity). For example, the sender may include all email addresses ending in @company.com, where "company.com" is the domain owned by the brand or the company. Thus, a first email address "john@company.com" and a second email address "no-reply@company.com" may be referred to as a single sender or, in the least, be categorized as related senders. In some embodiments, a sender may refer to a particular device or set of devices from which a message originates. In another example, a sender may include multiple email addresses for a set of related domains. For instance, a sender may have multiple domains, but may appear to originate from a same logical sender from the perspective of a recipient device.

As used herein, the term "recipient" refers to the target of the message. In particular, the term "recipient" may refer to the individual or company that is the target of an electronic message. In some embodiments, the recipient may be the individual or company to whom the sender has addressed the message. In some embodiments, the recipient may be identified by a unique identifier, such as an email address, a telephone number, a social medial handle, an identification number, any other identifier, and combinations thereof. In some embodiments, the unique identifier may be the same type as the identifier of the sender (e.g., a recipient email matched to a sender email). In one or more embodiments, the sender and/or recipient identifiers refer to unique identifiers that may be traced to a unique sender or recipient, but that does not include specific identifying information that can be tied to a specific individual or organization.

As used herein, the term "message frequency" may refer to a representation of the number or quantity of messages sent by a sender over a period of time. As will be discussed in further detail herein, the message frequency may be the number or quantity of messages sent by the sender to a unique recipient (e.g., a given recipient from pool of recipients) over the period of time. The message frequency may be based on any period of time, including (by way of example) messages per hour, messages per day, messages per week, messages per month, or any other period of time. The unique recipient may be a recipient having a unique identifier. In some embodiments, the message frequency may be associated with a single sender identifier (e.g., a single email address, a single phone number). In some embodiments, the message frequency may be associated with a brand, which may be associated with one or multiple sender entities.

In one or more embodiments, a message frequency may be further classified using one or more frequency ratings or frequency rating metrics. As used herein, the term "frequency rating metrics" or "frequency ratings" may refer a measure or value based on an analysis of the message frequency for a brand. The frequency rating metrics may include a noise rank of the sender. For example, the noise rank may include a ranking of how many messages the sender sends. The noise rank may be number or color coded, such as green for low noise (e.g., a low message frequency), yellow for medium noise (e.g., a medium message frequency), and red for high noise (e.g., a high message frequency). In some embodiments, the frequency rating metrics may include message categories of messages with an associated category message frequency. In some embodiments, the frequency rating metrics may include the message frequency for specific emails from a particular brand or domain. In some embodiments, the frequency rating metrics may include any other type of frequency rating metric, such as message size, message length, message content, message media type, any other rating metric, and combinations thereof.

FIG. 1 is a representation of a messaging environment 100 having a sender 102 transmitting messages 104 to one or more recipients at recipient client device(s) 106, according to at least one embodiment of the present disclosure. The sender 102 may transmit the messages 104 to the recipient client device(s) 106 over a network 108. In some embodiments, one or more server device(s) 110 may receive the messages 104 before transmitting the messages 104 to the recipient client device(s) 106. The server device(s) 110 may receive the messages 104 directly from the sender 102 and/or may receive the messages 104 via the network 108.

The server device(s) 110 may receive the messages 104 and process them. For example, the server device(s) 110 may receive the messages 104 and determine a message frequency for the sender 102 using a noise management system 112. For example, the noise management system 112 may store and access data from a data storage 114 on (or otherwise accessible to) the server device(s) 110 to analyze communications from the sender 102 to recipients and determine the frequency with which the sender 102 transmits the messages 104.

In some embodiments, as discussed herein, the noise management system 112 may determine one or more frequency rating metrics of the messages sent by the sender 102. For example, the noise management system 112 may analyze aggregate information regarding the number or quantity of messages 104 transmitted by the sender 102 and the total number or quantity of intended recipients. Using the aggregate message information, the noise management system 112 may determine the message frequency of messages transmitted by the sender.

The noise management system 112 may send a message to the recipient client device(s) 106 including the determined frequency rating metrics. For example, the noise management system 112 may transmit a new message and include, in conjunction with the new message, the determined frequency rating metrics. This may allow a user to determine whether to subscribe or continue subscribing to the messages transmitted by the sender 102. In some examples, the noise management system 112 may include the frequency rating metrics as an add-on or appendix to the messages 104 transmitted to the recipient client device(s) 116.

Figure 2:
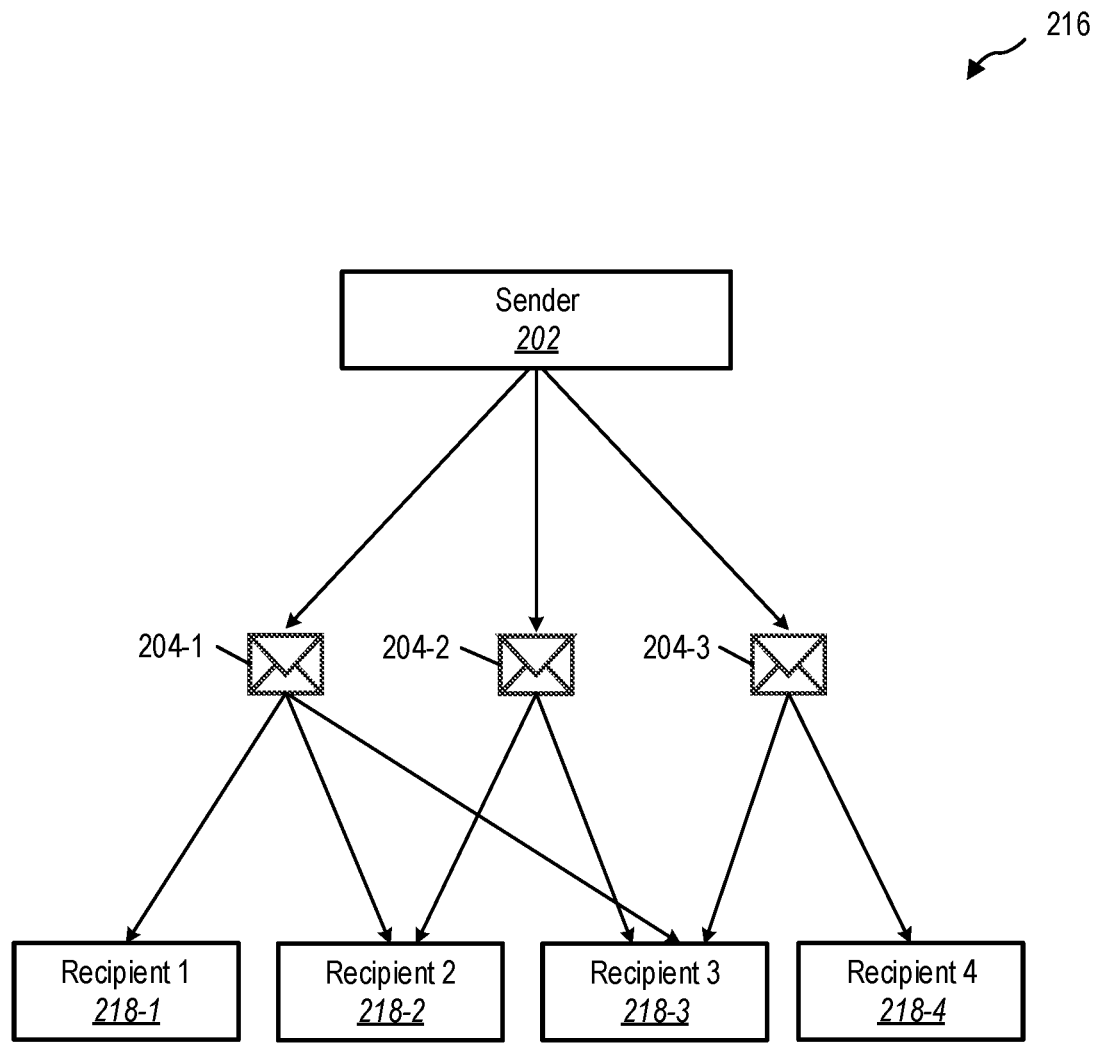
FIG. 2 is a representation of messaging environment, according to at least one embodiment of the present disclosure.

FIG. 2 is a representation of a messaging environment 216 including a plurality of messages (collectively 204) from a sender 202 to a plurality of recipients (collectively 218), according to at least one embodiment of the present disclosure. Each of the messages 204 may be sent to a plurality of the recipients 218. For example, as shown in FIG. 2, a first message 204-1 may be sent to three recipients 218, including a first recipient 218-1, a second recipient 218-2, and a third recipient 218-3. A second message 204-2 may be sent to two recipients 218, including the second recipient 218-2 and the third recipient 218-3. A third message 204-3 may be sent to two recipients 218, including the third recipient 218-3 and a fourth recipient 218-4.

As may be seen, the first recipient 218-1 may receive a single message 204, including the first message 204-1. The second recipient 218-2 may receive two messages, including the first message 204-1 and the second message 204-2. The third recipient 218-3 may receive three messages, including the first message 204-1, the second message 204-2, and the third message 204-3. The fourth recipient 218-4 may receive one message, including the third message 204-3. While not shown in this example, the communication environment may include any number of additional recipients that are not intended recipients of the messages 204 (e.g., non-subscribers to the sender 202).

In accordance with at least one embodiment of the present disclosure, the noise management system (e.g., the noise management system 112 of FIG. 1), may receive or determine the aggregate of the messages 204 sent by the sender 202. The noise management system may analyze the number or quantity of messages 204 and the number or quantity of intended recipients 218 of the messages 204. The noise management system may further analyze the number or quantity of the recipients 218 to which each messages 204 may be sent. The noise management system may then analyze when each of the messages 204 was sent. Using the aggregate information of the messaging environment 216, the noise management system may determine a message frequency of the messages 204.

As an illustrative example, where three messages 204 are sent in a single day. The first recipient 218-1 and the fourth recipient 218-4 may receive one message, the second recipient 218-2 may receive two messages, and the third recipient 218-3 may receive three messages for the single day, which may be extrapolated into a prediction of messages sent by the sender for a given day. In this manner, in the simplified example shown in FIG. 2, the sender 202 has a message frequency of about 1.75 messages per day to a unique recipient (e.g., total messages received by all recipients divided by number or quantity of unique recipients intended to receive the messages ((3+2+2)/4)). Put another way, each unique recipient 218 receives about 1.75 messages per day. It should be understood that the example shown is a simplified example, and that more or fewer messages 204 may be included, more or fewer recipients 218 may be included, and/or the messages 204 may be tracked over different time frames. The message frequency may be determined based on any number or quantity of factors.

In some embodiments, the messages 204 may be categorized into one or more message categories. For example, the content of the first message 204-1 may include a different message category than the second message 204-2 and/or the third message 204-3. In some embodiments, the first message 204-1, the second message 204-2, and the third message 204-3 may be representative of message categories. Each of the message categories may include multiple messages transmitted to various recipients 218. The message frequency may be determined for the combined messages 204, and/or for each message category.

In some embodiments, a single message 204 may include content from multiple categories. A message 204 including multiple categories may only be counted once for the total message frequency. The single message 204 may further be counted in category message frequency for each respective message category for which the message 204 includes content. Thus, the message may be considered in conjunction with other messages of different categories in determining overall message frequency for the sender while also considered in conjunction with other messages of a same category in determining a category message frequency.

Figure 3:
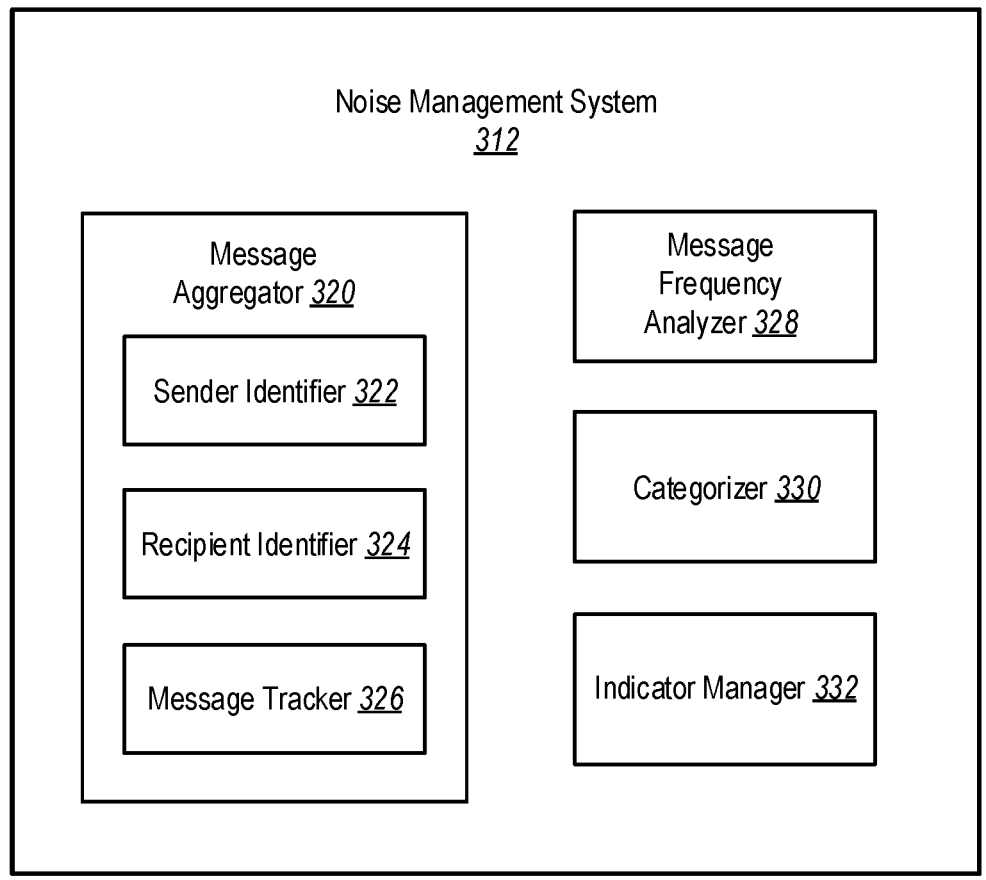
FIG. 3 is a representation of a noise management system, according to at least one embodiment of the present disclosure.

FIG. 3 is a representation of a noise management system 312, according to at least one embodiment of the present disclosure. Each of the components 320-332 of the noise management system 312 can include software, hardware, or both. For example, the components 320-332 can include one or more instructions stored on a computer-readable storage medium and executable by processors of one or more computing devices, such as a client device or server device. When executed by the one or more processors, the computer-executable instructions of the noise management system 312 can cause the computing device(s) to perform the methods described herein. Alternatively, the components 320-332 can include hardware, such as a special-purpose processing device to perform a certain function or group of functions. Alternatively, the components 320-332 of the noise management system 312 can include a combination of computer-executable instructions and hardware.

Furthermore, the components 320-332 of the noise management system 312 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 320-332 may be implemented as a stand-alone application, such as a desktop or mobile application. Furthermore, the components 320-332 may be implemented as one or more web-based applications hosted on a remote server. The components 320-332 may also be implemented in a suite of mobile device applications or "apps." In one or more embodiments, the components 320-332 are implemented across multiple devices. For example, one or more of the components 320-332 (or select features of the individual components) may be implemented on a server device while other components may be implemented on a client device, third-party server device, or other separate device.

The noise management system 312 may be located at the message server. For example, the noise management system 312 may be installed on the message server for the recipient's domain. This may allow the noise management system 312 to analyze each message that is transmitted to the recipient's domain. In some embodiments, the noise management system 312 may be located at the message server for the host of a messaging system (e.g., a public or private system). As an illustrative and non-limiting example, the noise management system 312 may be located at the message server for Microsoft Outlook email messaging. This may allow the noise management system 312 to analyze aggregations of a large amount of messages, including emails from multiple senders to multiple recipients. By analyzing aggregate messages from a messaging system host, the noise management system 312 may develop a message frequency for a sender that is representative of the actual message frequency from the sender.

The noise management system 312 may include a message aggregator 320. The message aggregator 320 may aggregate information related to messages that are communicated via a messaging service. For example, the message aggregator 320 may track a count of messages that are received and processed by the messaging service. In accordance with examples described herein, the message aggregator 320 can identify and determine a number of recipients for each message(s) received from a given sender as well as determine a total number of messages that are delivered to a plurality of recipients associated with the message server. As shown in FIG. 3, the message aggregator 320 may include a sender identifier 322, a recipient identifier 324, and a message tracker 326. Each of these components 322-326 will be discussed in further detail below.

The message aggregator 320 may include a sender identifier 322 and a recipient identifier 324. The sender identifier 322 may identify the sender. For example, the sender identifier 322 may identify a specific identifier of the sender (such as a specific email address, phone number, social media handle, and so forth). In some examples, the sender identifier 322 may identify a specific domain of the sender (such as a suffix to an email address). In some examples, the sender identifier 322 may identify a brand of the sender. For example, the sender identifier 322 may associate known identifiers with a brand, and any message sent from the known identifiers may be associated with the sender's brand.

In some embodiments, the recipient identifier 324 may identify unique recipients. For example, the recipient identifier 324 may identify unique recipients using one or more unique identifiers (such as a specific email address, phone number, social media handle, and so forth).

The message aggregator 320 may further include a message tracker 326. The message tracker 326 may track the number or quantity of messages sent by senders to unique recipients. For example, the message tracker 326 may count the total number or quantity of messages sent by a single sender. The message tracker 326 may further count the number or quantity of unique recipients that received the messages sent by the sender.

In accordance with at least one embodiment of the present disclosure, the message aggregator 320 may anonymously track messages. For example, the sender identifier 322 may assign each sender a sender ID and the recipient identifier 324 may assign each recipient a recipient ID. Any information stored by the noise management system 312 regarding the sender or recipient may be stored by the sender ID or the recipient ID. In some embodiments, the noise management system 312 may not store any sender or recipient information in the server to preserve their anonymity. In one or more implementations, the noise management system 312 stores sender and/or recipient data using a derived, encrypted, or otherwise anonymous version of the sender or recipient ID. Indeed, as will be discussed below, the sender and/or recipient IDs may include no personal information, but may simply be used to determine a total number of unique identifiers for purposes of determining a number of messages that are delivered to a corresponding set of recipients.

The noise management system 312 may include a message frequency analyzer 328. The message frequency analyzer 328 may review the information from the message aggregator 320 and determine a message frequency for the sender. For example, as discussed herein with respect to FIG. 2, the message frequency analyzer 328 may analyze the total number or quantity of unique recipients and the total number or quantity of messages sent by the sender. Using these total numbers or quantities, the message frequency analyzer 328 may determine the message frequency for the sender.

The message frequency analyzer 328 may determine the message frequency using a variety of analysis mechanisms and techniques. For example, the message frequency analyzer 328 may perform a statistical analysis of the aggregate message information generated by the message aggregator 320. In some embodiments, the message frequency analyzer 328 may determine the message frequency using a running average for a given sender or for multiple sub-entities related to a single sender (e.g., ads, shipping, info associated with a related domain). Generating a running average may reduce the information stored by the message frequency analyzer 328. In some embodiments, the message frequency analyzer 328 may determine the message frequency using any statistical analysis mechanism.

In some embodiments, the message frequency analyzer 328 may determine an average message frequency over a time range. For example, the message frequency analyzer 328 may determine the average message frequency in the immediate past, such as over the past week, the past month, the past year, the entire history that the sender has sent messages, or any value therebetween. By determining the average message frequency over a historical time period, the message frequency determined by the message frequency analyzer 328 may be representative of the amount of messages the sender currently sends over some duration of time.

In some examples, the message frequency analyzer 328 may determine the message frequency over a particular date range. In some examples, the message frequency analyzer 328 may determine the message frequency during a particular day, week, month, or year in the past, any other particular date range, and combinations thereof. This may allow the message frequency analyzer 328 to determine how many messages the sender sends over any given date range. Furthermore, by determining the message frequency over a date range, in combination with the message frequency over the immediate past, the message frequency analyzer 328 may determine whether the sender sends more or fewer messages based on the date or date range.

In some embodiments, the message frequency analyzer 328 may determine the amount of messages sent in preparation for a particular holiday or other event. For example, the message frequency analyzer 328 may determine the message frequency during a particular event (including a range of time before/after the event), such as a holiday, corporate event, social event, convention, and combinations thereof. This may allow the message frequency analyzer 328 to determine trends of messages over different time periods leading up to certain events.

The message frequency analyzer 328 may generate a noise rank or other frequency indicator associated with the sender. The noise rank may include a quickly reviewable visual or alphanumeric representation of the message frequency for the sender. For example, the noise rank may be green for a low message frequency, yellow for a medium message frequency, and red for a high message frequency. The frequency raking may include a chart or graph, such as three bars for a high message frequency, two bars for a medium message frequency, and one bar for a low message frequency. In some examples, the noise rank may be set by the noise management system 312. In some examples, the noise rank may be set by the user. For example, the user may determine the range of message frequencies that are represented for each frequency rank of the noise rank.

More specifically, each of multiple noise ranks may be associated with specific ranges of frequencies or various threshold values. For example, in the instance discussed above where a noise rank can be green, yellow, or red, each of these noise ranks can be associated with different thresholds and ranges of frequency. As a first instance, each of the noise ranks may be associated with a predicted number of messages that a sender is predicted to send to a given recipient. By way of example, a low noise rank (e.g., represented by a green indicator) could be one or less messages per week (or other time period), a medium noise rank (e.g., represented by a yellow indicator) could be two to four messages per week (or other time period), while a high noise rank (e.g., represented by a red indicator) could be any quantity of messages greater than four. Other implementations may have different discrete ranges corresponding to any number of ranks.

As a second example related to the green, yellow, and red categories of noise ranks, the noise ranks could be associated with percentiles relative to other senders. For example, in one or more embodiments, message frequency analyzer 328 may determine percentiles for each of the senders associated with relative quantities of messages sent by the various senders. Where a sender is grouped in a lower percentile of message frequency (e.g., a lowest 25% ile of senders associated with sending a lower quantity of messages), the sender may be assigned a low (e.g., green) noise rank. Conversely, a sender grouped in a middle percentile of message frequency (e.g., 25-75% ile of senders), the sender may be assigned a medium (e.g., yellow) noise rank. Further, a sender grouped in a high percentile of message frequency (e.g., greater than 75% ile of senders), the sender may be assigned a high (e.g., red) noise rank. Other implementations may have more granular rankings and/or additional categories consistent with one or more embodiments.

The noise management system 312 includes a categorizer 330. The categorizer 330 may review the content of the messages from the sender and categorize them based on the content. For example, in some embodiments, the sender may tag, or otherwise identify or mark, the messages with a tag identifying the category of the message. In some examples, the categorizer 330 may identify keywords in the content of the message to categorize the message. In some implementations, the categorizer 330 determines a category based on a sender handle or other identifier (e.g., no-reply@company.com, membership@company.com, promotions@company.com).

In some embodiments, the categorizer 330 may categorize the messages into a plurality of message categories. The message categories may include advertisements, promotions, sales, coupons, product information, new products, product recommendations, political messaging, social media notifications, friend requests, solicitations for money, shipping information, order confirmations, customer service, text, images, length, size, any other message category, and combinations thereof. In some embodiments, a message may belong to a single message category. In some embodiments, a message may belong to multiple message categories.

In some embodiments, the message frequency analyzer 328 may determine the message frequency based on the message categories identified by the categorizer 330. For example, the message frequency analyzer 328 may determine a category message frequency for the message categories. For example, the message frequency analyzer 328 may determine a category message frequency for each message category identified by the categorizer 330. In some examples, the message frequency analyzer 328 may determine a category message frequency for message categories identified by a user, a message server, or other entity.

The noise management system 312 includes an indicator manager 332. The indicator manager 332 may provide the noise rank (or other frequency indicator) to the recipient. In some embodiments, the indicator manager 332 may provide an indicator to the recipient that indicates the noise rank of the sender of a message. In some embodiments, the indicator manager 332 may provide the noise rank determined by the message frequency analyzer 328 to the recipient.

In some embodiments, the indicator manager 332 may provide a noise rank that includes one or more frequency rating metrics. The frequency rating metrics may include the message frequency and associated information of the sender. For example, the frequency rating metrics may include the average message frequency of the sender, the message frequency over a period of time, the message frequency for a particular holiday or event, the category message frequency for one or more message categories, the message frequency associated with a particular message address, the total number or quantity of unique recipients, the total number or quantity of messages sent, any other metric, and combinations thereof.

In some embodiments, the indicator manager 332 may provide the noise rank to the recipient as a separate message. For example, the indicator manager 332 may send a new message to the recipient that includes the noise rank and/or the frequency rating metrics. The recipient may open the new message and review the noise rank and/or the frequency rating metrics. This may allow the user to review the noise rank and/or the frequency rating metrics and determine whether to continue to receive message from the sender.

In some embodiments, the indicator manager 332 may modify the message from the sender to include the noise rank. For example, the indicator manager 332 may append the message with the noise rank. In some examples, the indicator manager 332 may include the noise rank as an attachment to the message. In one or more embodiments, the indicator manager 332 provides a display of the noise rank within a presentation of the message. For example, the indicator manager 332 may provide a display of the noise rank within a preview or icon representative of the message. As another example, the indicator manager 332 may provide a display of the noise rank within the message after the message is opened by a recipient and while the message is displayed.

Figures 1, 4:
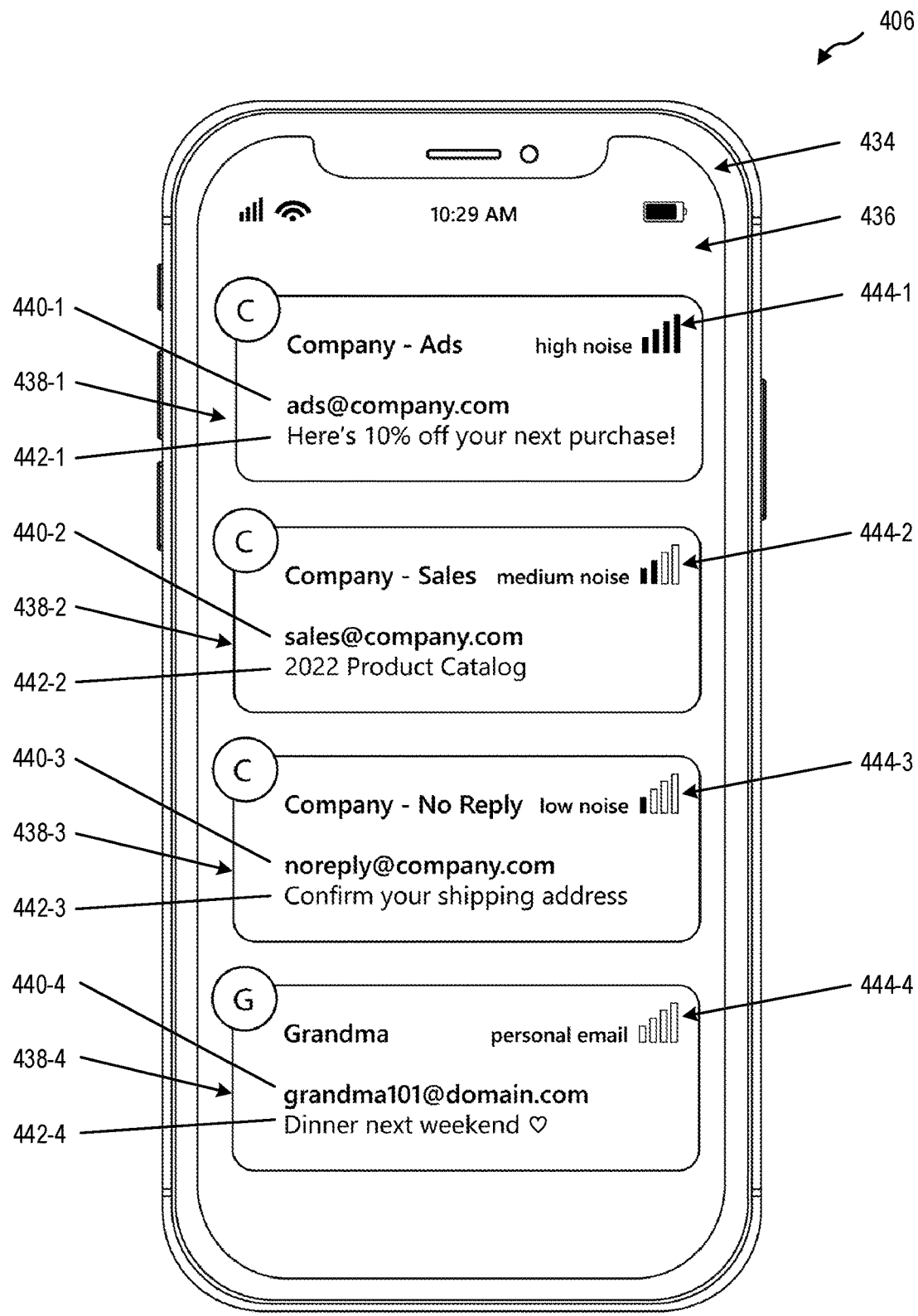
Figures 2, 4:
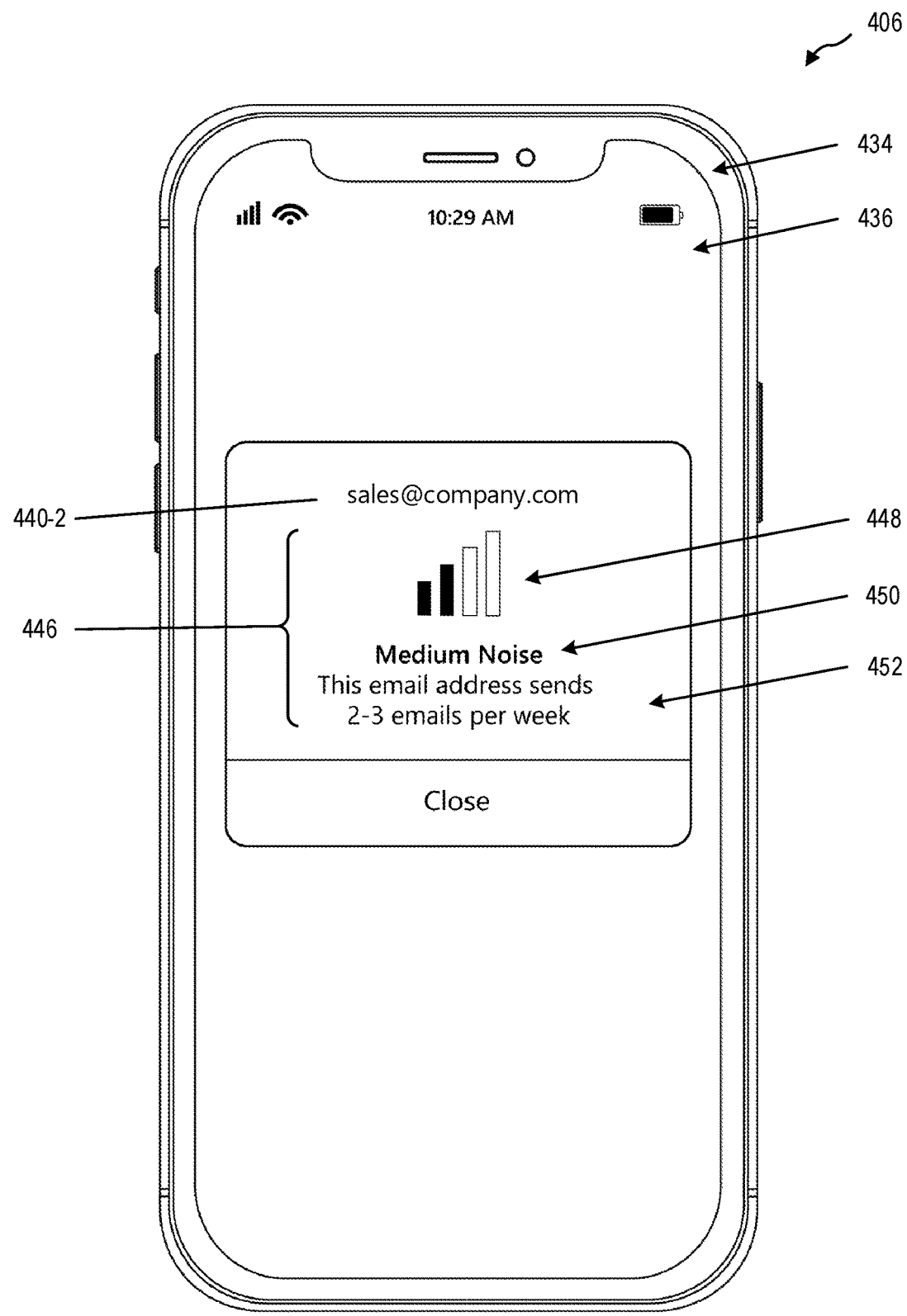
Figures 3, 4:
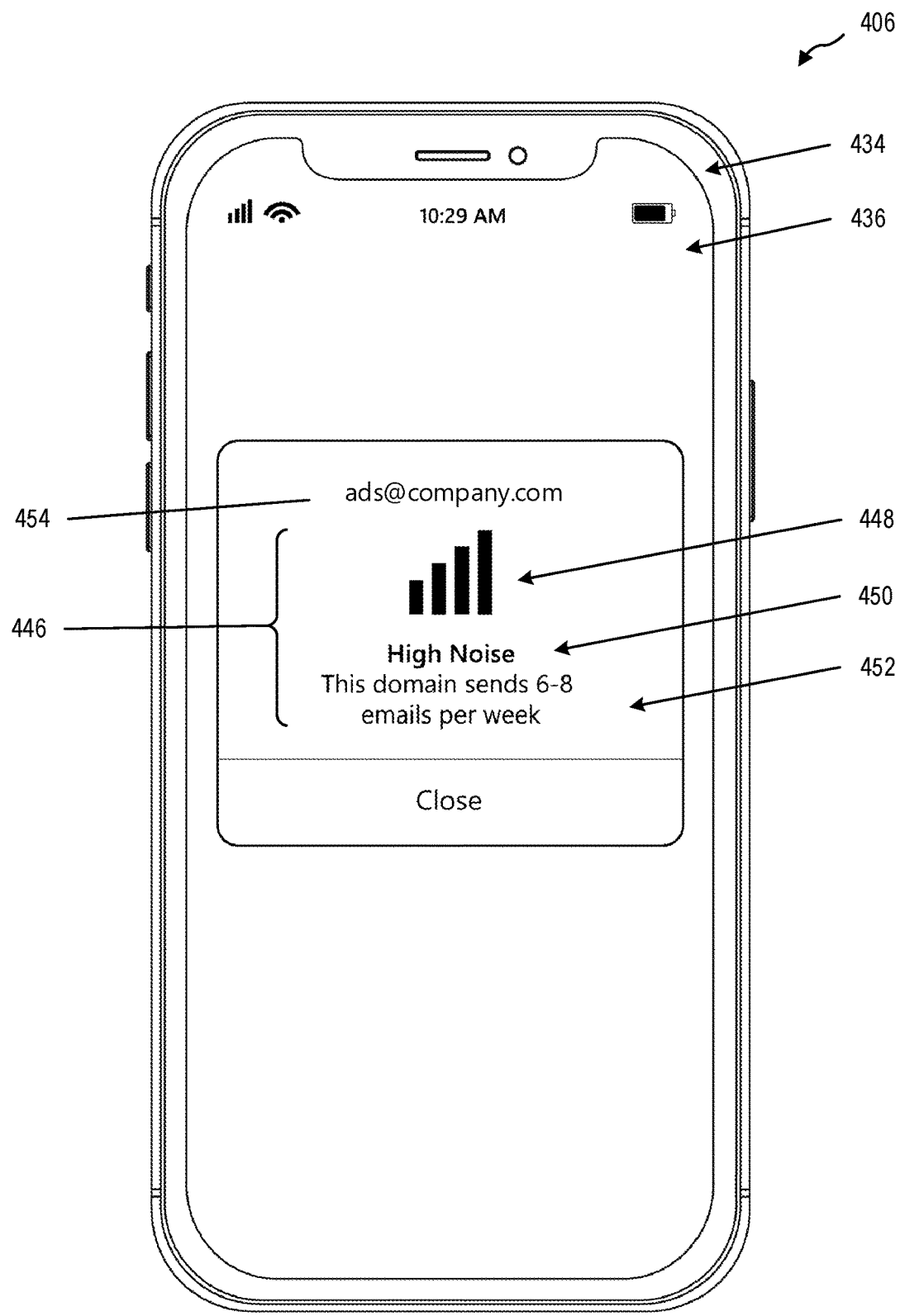
Figure 4:
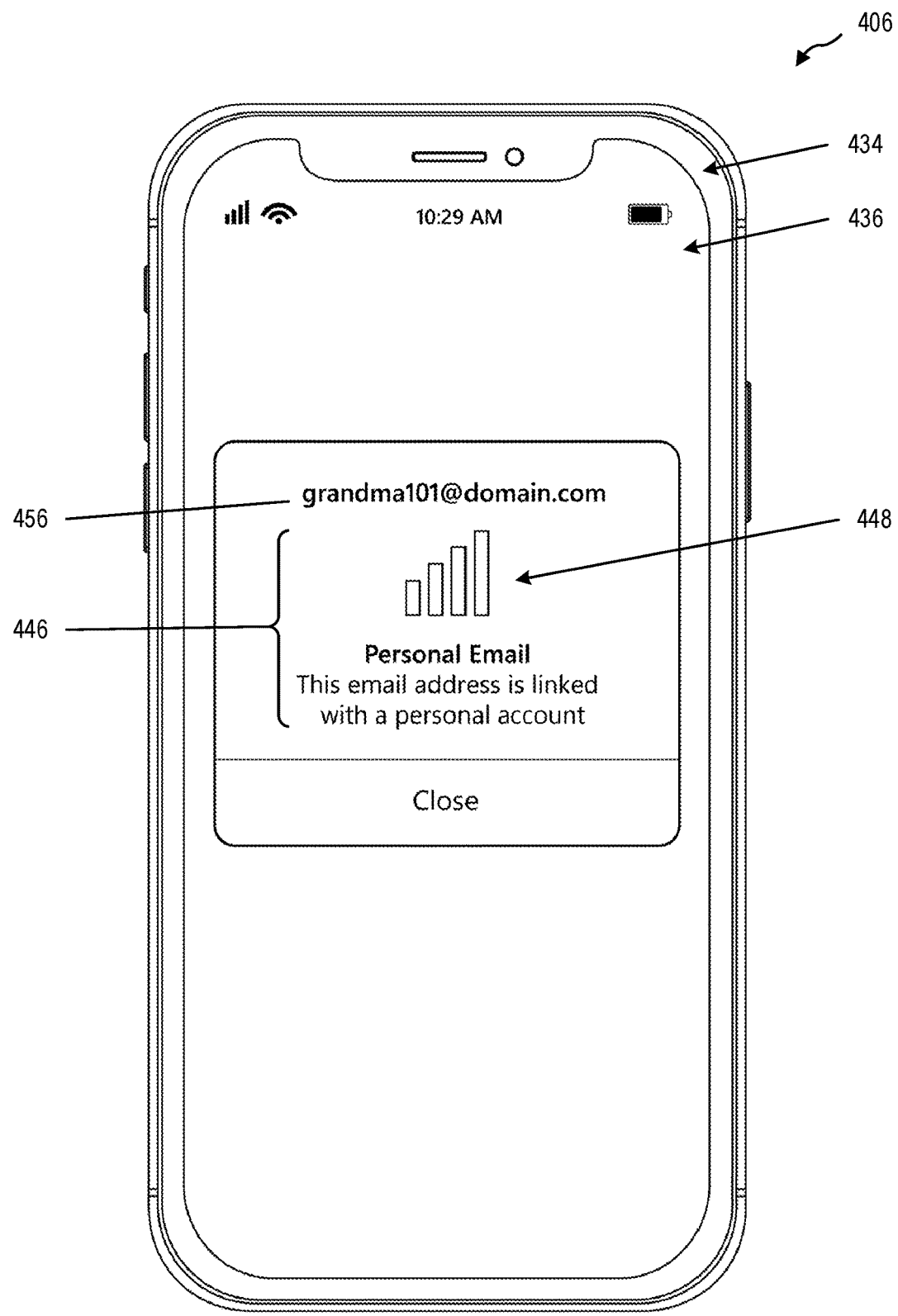

FIG. 4-1 is a representation of a recipient client device 406 having a screen 434 with a graphical user interface (GUI) 436, according to at least one embodiment of the present disclosure. The recipient client device 406 may generate a presentation (e.g., a message presentation) on the GUI 436. The presentation may include one or more messages (collectively 438) or message summaries. In the embodiment shown, the messages are representations or previews of emails from a sender address (collectively 440) that is an email address. However, it should be understood that the messages may be any type of message, as discussed herein.

In the embodiment shown, a first message 438-1 includes a first sender address 440-1 and a first subject line 442-1. The first sender address 440-1 shown is ads@company.com. The first message 438-1 may further include a first interactive frequency indicator 444-1. The first interactive frequency indicator 444-1 may be an interactive icon that provides an indication of the noise rank of the sender. For example, the first interactive frequency indicator 444-1 may be a graphical representation of the noise rank of the sender. In the embodiment shown, the first interactive frequency indicator 444-1 shows three full bars, indicating a high message frequency. However, the first interactive frequency indicator 444-1 may be any type of indication, including an icon, a numerical ranking, a letter-based ranking, one or more words, any other indication, and combinations thereof.

The GUI 436 shown includes four messages 438 associated with different senders, including the first message 438-1. The GUI 436 includes a second message 438-2 having a second sender address 440-2 and a second subject line 442-2. The second message 438-2 includes a second interactive frequency indicator 444-2. The second interactive frequency indicator 444-2 shown for the second message 438-2 shows a two full bars and a hollow bar. This may be an indication of a medium noise rank.

The GUI 436 includes a third message 438-3 having a third sender address 440-3 and a third subject line 442-3. The third message 438-3 includes a third interactive frequency indicator 444-3. The third interactive frequency indicator 444-3 shown for the third message 438-3 shows a one full bar and two hollow bars. This may be an indication of a low noise rank.

The GUI 436 includes a fourth message 438-4 having a fourth sender address 440-4 and a fourth subject line 442-4. The fourth message 438-4 includes a fourth interactive frequency indicator 444-4. The fourth interactive frequency indicator 444-4 shown for the fourth message 438-4 shows a zero full bars and a three hollow bars. This may be an indication of a no noise rank, as discussed herein with respect to FIG. 4-4.

It will be appreciated that the respective senders 440 may correspond to two or more sender entities. For example, each of the unique email addresses may refer to different senders. Alternatively, it will be noted that each of the first three senders have different identifiers ("ads," "info," and "noreply") associated with the same domain (company.com) while the fourth sender has an identifier ("grandma"). In this example, the first three messages may be associated with a first sender while the fourth message is associated with a second sender.

Accordingly, while FIG. 4-1 shows the first three messages being associated with different frequency indicators, one or more embodiments may associate these messages with the same metric of frequency indicator based on the domains being associated with the same sender entity. Nevertheless, as shown in FIG. 4-1, each of the different messages, while from a common (or otherwise related) domain, may nevertheless have different frequency indicators associated therewith based on the individual messages being categorized differently and having a different category frequency associated therewith.

In some embodiments, the interactive frequency indicators 444 may be informative. For example, the interactive frequency indicators 444 may be located in the messages 438 for informative purposes, while not necessarily interactive. In some embodiments, the interactive frequency indicators 444 may be interactive. For example, a user may select the interactive frequency indicators 444 to receive additional information about the noise rank of the sender. The user may select the interactive frequency indicators 444 in any manner, such as by a click, a touch on a touchscreen, a swipe, a gesture, any other selection. Selecting the interactive frequency indicators 444 may cause the recipient client device 406 to prepare an additional presentation to display on the GUI 436.

In FIG. 4-2, the recipient client device 406 may provide additional information for a particular sender upon receiving a selection of an interactive frequency indicator. For example, FIG. 4-2 shows an example interface based on selection of the second interactive frequency indicator 444-2. For example, the recipient client device 406 may provide a sender-specific interface for the sender that includes a presentation on the GUI 436 of frequency rating metrics 446 of the sender. In the view shown, the presentation includes the frequency rating metrics 446 of the sender as represented by the second sender address 440-2. The frequency rating metrics 446 may include more detail regarding the noise rank than presented as part of the second interactive frequency indicator 444-2.

In the embodiment shown, the frequency rating metrics 446 includes the second sender address 440-2, a graphical noise rank 448, a descriptive noise rank 450, and noise statistics 452. The graphical noise rank 448 shown is the same icon or graphical representation shown as the second interactive frequency indicator 444-2. In some embodiments, the graphical noise rank 448 may be any other graphical or iconic representation of the noise rank of the sender. The descriptive noise rank 450 may be a written description of the noise rank. The noise statistics 452 may include the message frequency of the sender. The frequency rating metrics 446 may include any other information regarding the message frequency or noise rank of the sender, such as the category message frequency.

In FIG. 4-3, the recipient client device 406 may have received a selection of any of the first interactive frequency indicator 444-1, the second interactive frequency indicator 444-2, or the third interactive frequency indicator 444-3. The recipient client device 406 may prepare a presentation on the GUI 436 of the frequency rating metrics 446 of the sender. In the view shown, the presentation includes the frequency rating metrics 446 of the sender as represented by the sender domain 454. This may include the graphical noise rank 448 of the sender of the sender domain 454, the descriptive noise rank 450 of the sender domain 454, the descriptive noise rank 450 of the sender domain 454, and the noise statistics 452 of the sender domain 454. In some embodiments, the sender domain 454 may be represented by the suffix (e.g., the domain) of the email address of the sender. In some embodiments, the sender domain 454 may be representative of the entire brand. As mentioned above, in some instances, any number of email addresses including the sender domain 454 may be associated with a common sender.

In FIG. 4-4, the recipient client device 406 may have received a selection of the fourth interactive frequency indicator 444-4. The recipient client device 406 may prepare a presentation on the GUI 436 of the frequency rating metrics 446 of the sender. In the view shown, the sender may include a personal contact and the address 456 of the person. For example, the sender shown may be the grandmother of the receiver. The server may not receive sufficient aggregate message information (including a sufficient number of messages and/or a sufficient number of recipients) to prepare frequency rating metrics 446 of the sender. An individual may not send as many messages as a brand, even an individual that sends a lot of messages. Because the individual may not generate sufficient aggregate message information, the server may not prepare a message frequency and noise rank. This may be reflected the graphical noise rank 448 and descriptions in the frequency rating metrics 446.

Figures 1, 5:
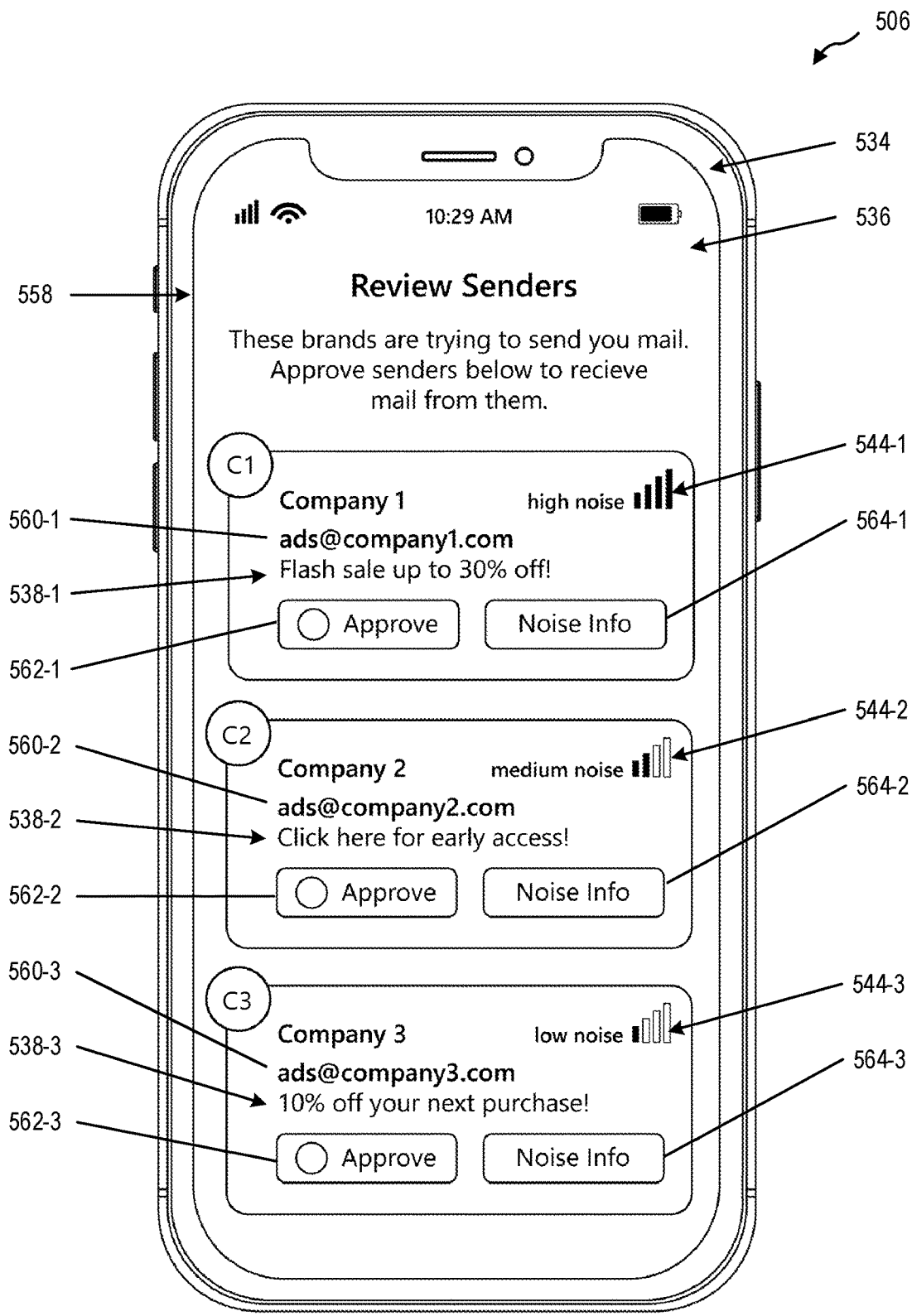
Figures 2, 5:
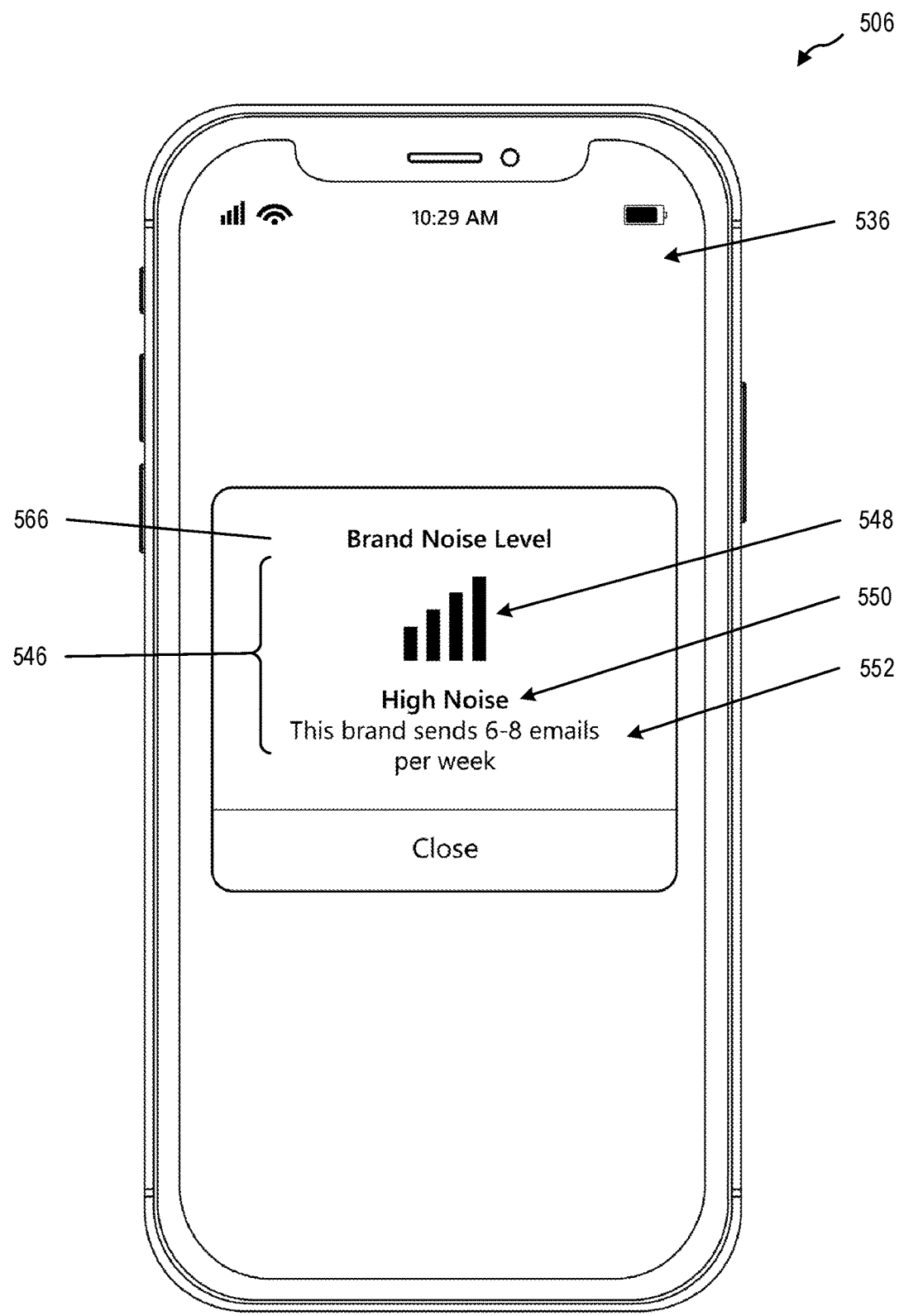
Figures 3, 5:
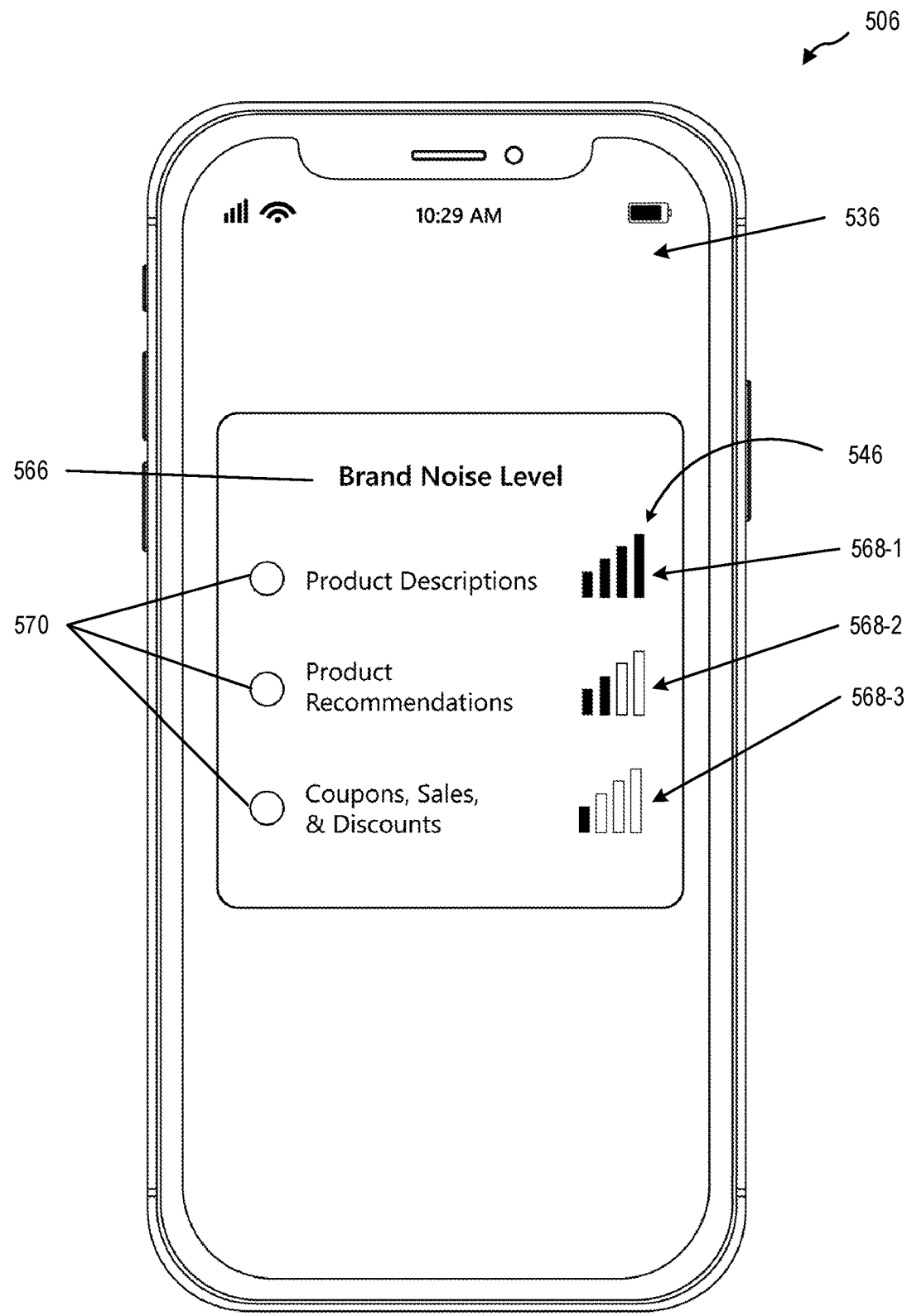

FIG. 5-1 is a representation of a recipient client device 506 having a screen 534 with a graphical user interface (GUI) 536, according to at least one embodiment of the present disclosure. The recipient client device 506 may generate a presentation 558 on the GUI 536. The presentation 558 may include one or more messages (collectively 538) from one or more senders. The presentation 558 may be a review of the senders before the messages from the senders enters the recipient inbox, or before the recipient has received the messages and/or additional messages from the sender. The presentation 558 may include a notification 458 that the senders are trying to send the recipient messages.

In some embodiments, the presentation 558 may include a first message 538-1 from a first sender 560-1. The recipient may be able to manage approvals of continued recipience of messages from the first sender 560-1. For example, the first message 538-1 may include a first approval indicator 562-1. To approve messages from the first sender 560-1, the user may select the first approval indicator 562-1. The first message 538-1 may further include a first interactive frequency indicator 544-1 and a first noise information indicator 564-1. The recipient may be able to determine the noise rank of the sender based on the first interactive frequency indicator 544-1 and select one or both of the first interactive frequency indicator 544-1 or the first noise information indicator 564-1 to receive frequency ranking metrics for the first sender 560-1.

A second message 538-2 may include a second approval indicator 562-2. To approve messages from the second sender 560-2, the user may select the second approval indicator 562-2. The second message 538-2 may further include a second interactive frequency indicator 544-2 and a second noise information indicator 564-2. The recipient may be able to determine the noise rank of the sender based on the second interactive frequency indicator 544-2 and select one or both of the second interactive frequency indicator 544-2 or the second noise information indicator 564-2 to receive frequency ranking metrics for the second sender 560-2.

A third message 538-3 may include a third approval indicator 562-3. To approve messages from the third sender 560-3, the user may select the third approval indicator 562-3. The third message 538-3 may further include a third interactive frequency indicator 544-3 and a third noise information indicator 564-3. The recipient may be able to determine the noise rank of the sender based on the third interactive frequency indicator 544-3 and select one or both of the third interactive frequency indicator 544-3 or the third noise information indicator 564-3 to receive frequency ranking metrics for the third sender 560-3.

As may be seen in FIG. 5-2, when the recipient selects one of the interactive frequency indicators and/or the noise information indicators, the recipient client device 506 may provide a presentation on the GUI 536 that includes the frequency noise metrics 546 for a particular brand 566. The frequency noise metrics 546 may include a graphical noise rank 548, a descriptive noise rank 550, and noise statistics 552.

As shown in FIG. 5-3, the recipient client device 506 may provide a presentation on the frequency noise metrics 546 including frequency noise metrics 546 of the category message frequencies (collectively 568) for the sender (e.g., the brand 566). In the embodiment shown, the category message frequencies 568 includes a first category message frequency 568-1, a second category message frequency 568-2, and a third category message frequency 568-3. Each of the category message frequencies 568 may be toggled using a toggle icon 570 to determine a preference of the recipient with regard to selectively receiving messages of the respective category message frequencies 568.

Figure 6:
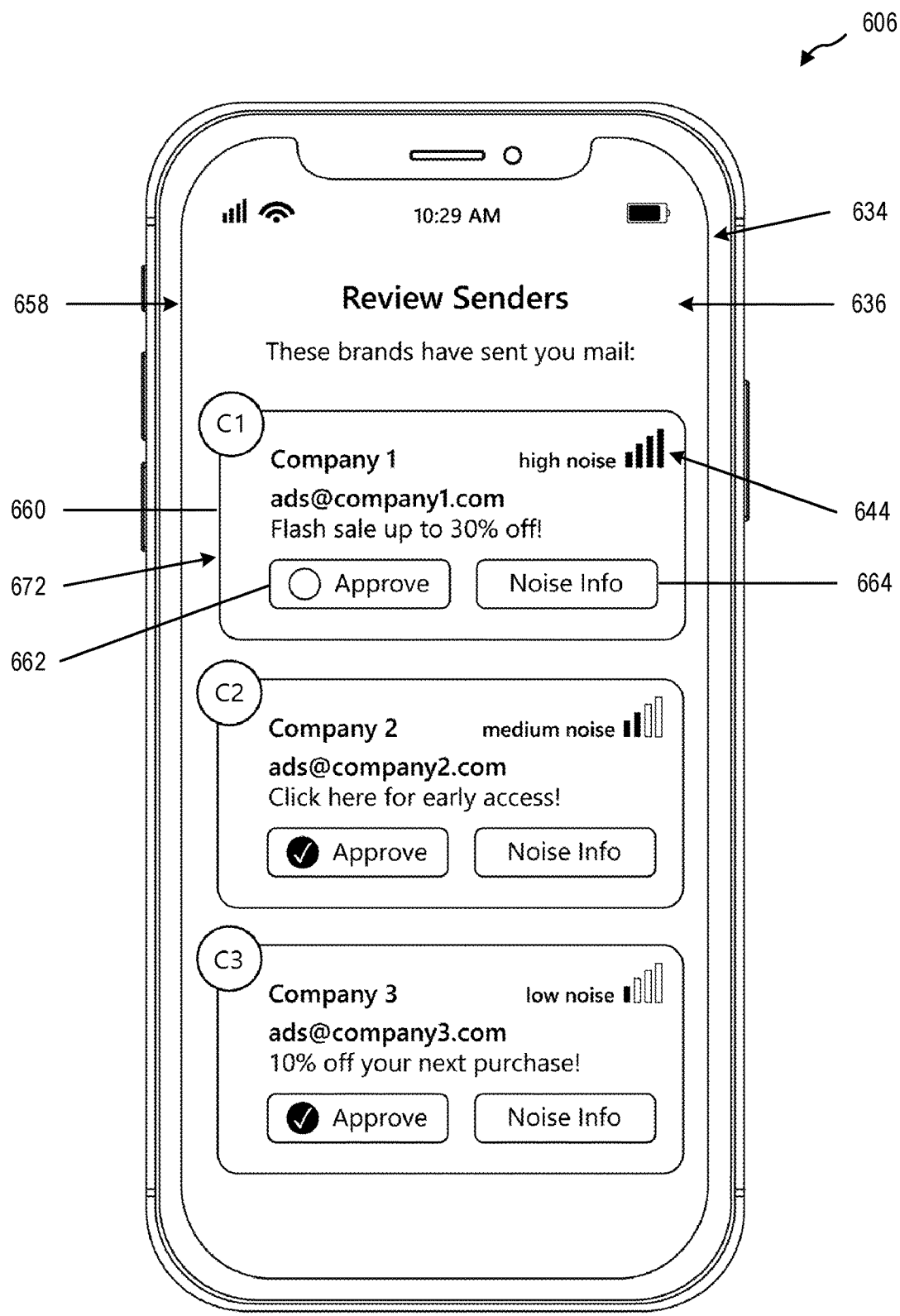
FIG. 6 is a representation of a client device presenting messages on a GUI, according to at least one embodiment of the present disclosure.

FIG. 6 is a representation of a recipient client device 606 having a screen 634 with a graphical user interface (GUI) 636, according to at least one embodiment of the present disclosure. The recipient client device 606 may generate a presentation on the GUI 636. The presentation may include one or more sender summaries 672 from one or more senders. The presentation may be a review of the senders that the recipient is has received messages from, and may be generated after the recipient has received the messages from the sender. The presentation may include a notification 658 that the senders have sent or are sending the recipient messages.

In some embodiments, the sender summary 672 may include an identification of a sender 660. The recipient may be able to manage approvals of continued recipience of messages from the sender 660. For example, the sender summary 672 may include an approval indicator 662. To approve messages from the sender 660, the user may select the approval indicator 662. The sender summary 672 may further include an interactive frequency indicator 644 and a noise information indicator 664. The recipient may be able to determine the noise rank of the sender 660 based on the interactive frequency indicator 644 and select one or both of the interactive frequency indicator 644 or the noise information indicator 664 to receive frequency ranking metrics for the sender 660. In this manner, the recipient may quickly review the subscribed messages from various senders 660. The user may further subscribe or unsubscribe from the messages using the approval indicator 662.

For example, as shown in FIG. 6, a user of the client device 606 may select an approve icon for the second sender ("info@company.com") and a third sender ("mail@company3.com"). In this example, the recipient may continue receiving (or begin receiving) messages originating from the second and third senders. Conversely, where the user of the client device 606 does not select the approval indicator 662 for the first sender ("ads@company1.com"), the message server (or the client device 606) may cause messages originating from the first sender to be filtered. For example, the messages from the first sender may be blocked, sorted to junk, or otherwise prevented from delivery to an inbox of the recipient. These filtering actions may take place at the client device 606 or, alternatively, at the message server.

Moreover, while the above example shown in FIG. 6 is discussed in connection with filtering messages at variable frequencies from respective senders, similar features may be applied to previous examples, such as where messages originating from the same sender are categorized differently from one another. Thus, a recipient may select approval indicators for respective categories and similarly cause select messages from a given sender to be selectively delivered (or selectively filtered) in accordance with one or more embodiments described herein.

In addition, while not explicitly shown in the above-described figures, a recipient may indicate a general preference with regard to senders having at or above a threshold noise level. For example, a recipient may select an approval indicator to indicate a preference to receive messages from senders that have less than a threshold noise level (e.g., low and/medium noise levels) while filtering messages from senders that are at or above the threshold noise level (e.g., medium and/or high noise levels). Notwithstanding these broad preferences, a recipient could nonetheless review individual senders that are at or above the noise thresholds and indicate exceptions such that certain senders that a recipient wants to receive emails from can send those emails notwithstanding that sender being associated with a high noise rating (e.g., higher than the threshold noise rating).

Figure 7:
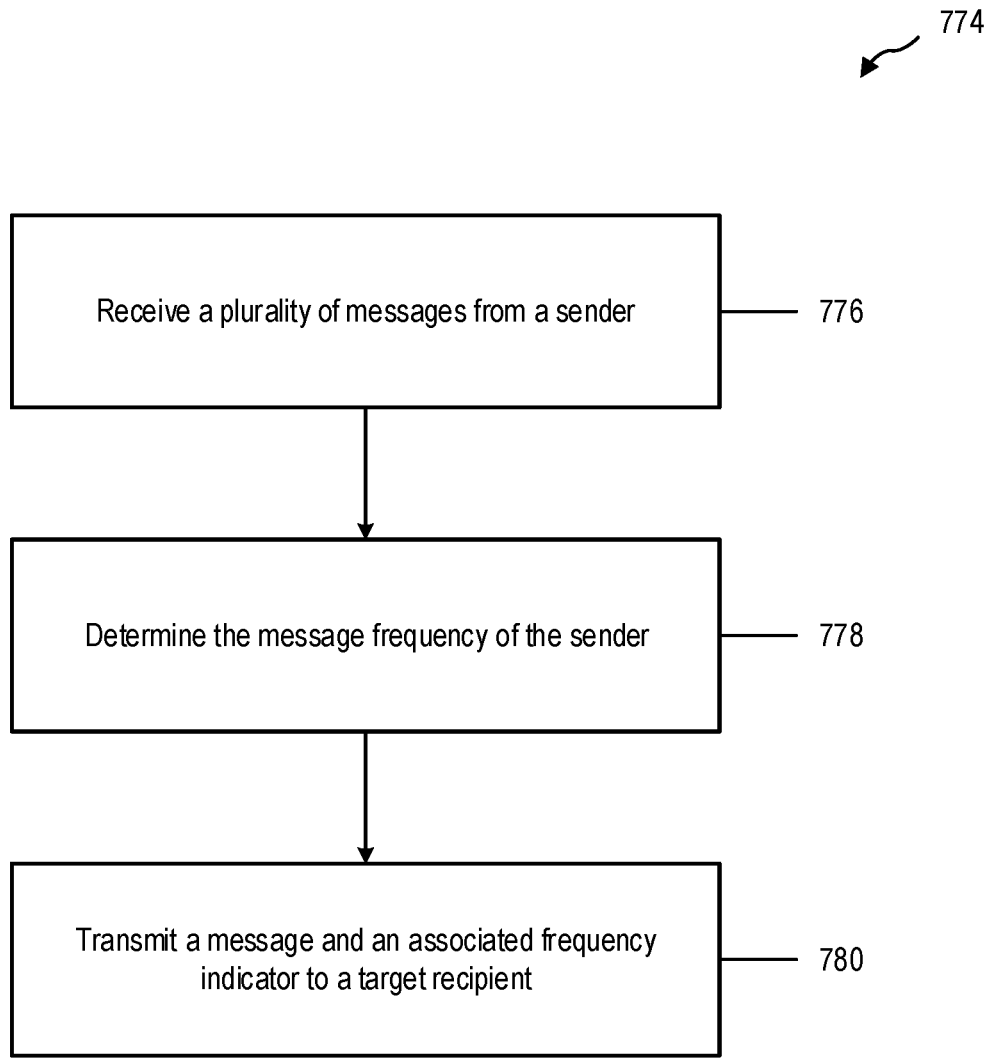
FIG. 7 is a flowchart of a method for managing messages, according to at least one embodiment of the present disclosure.
Figure 8:
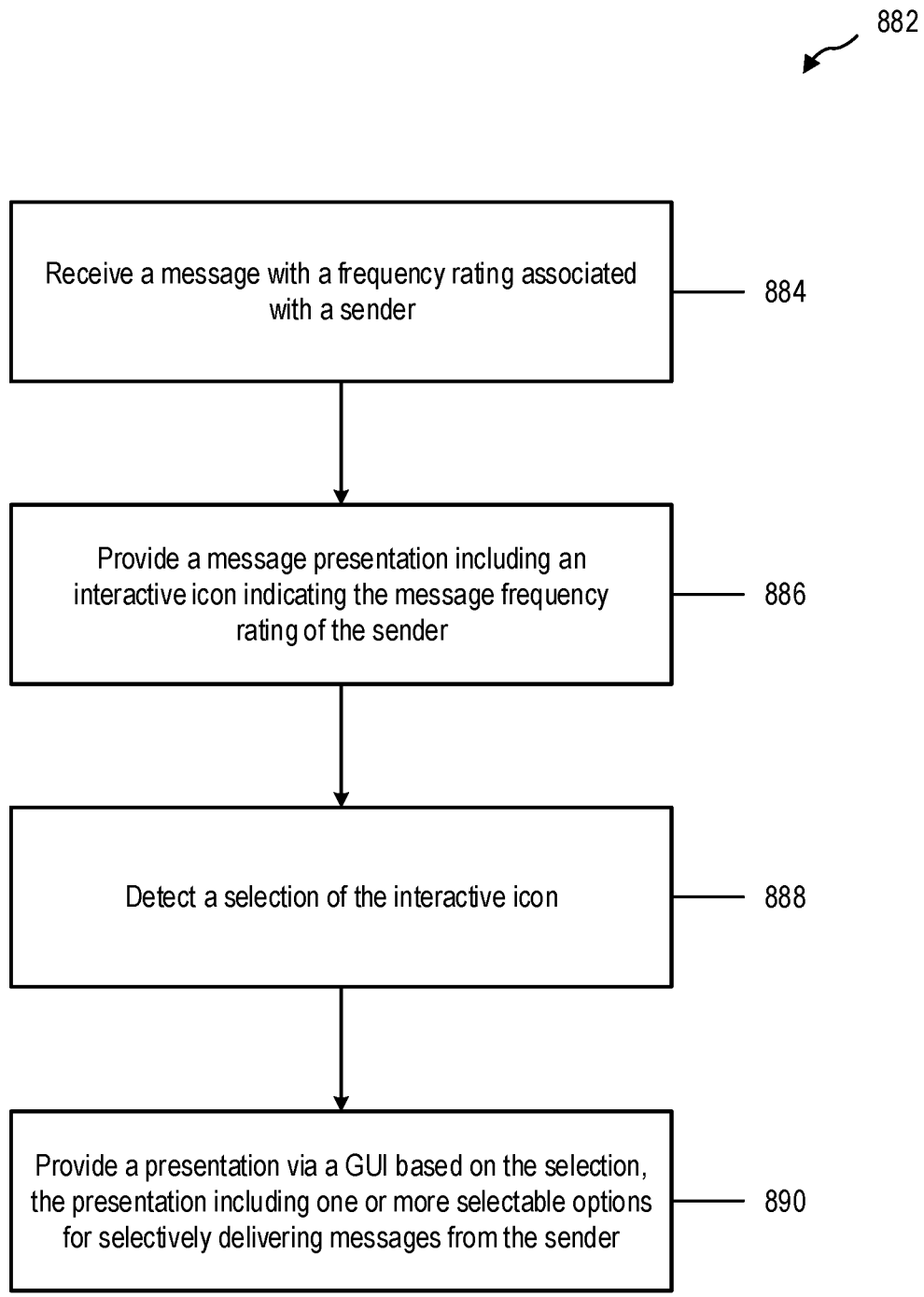
FIG. 8 is a flowchart of a method for managing messages, according to at least one embodiment of the present disclosure.

FIGS. 7 and 8, the corresponding text, and the examples provide a number of different methods, systems, devices, and non-transitory computer-readable media of the noise management system 312 of FIG. 3. In addition to the foregoing, one or more embodiments can also be described in terms of flowcharts comprising acts for accomplishing a particular result, as shown in FIGS. 7 and 8. FIGS. 7 and 8 may be performed with more or fewer acts. Further, the acts may be performed in differing orders. Additionally, the acts described herein may be repeated or performed in parallel with one another or parallel with different instances of the same or similar acts.

As mentioned, FIG. 7 illustrates a flowchart of a series of acts for managing messages in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device to perform the acts of FIG. 7. In some embodiments, a system can perform the acts of FIG. 7.

In FIG. 7, a series of acts 774 for managing messages may include an act 776 of receiving a plurality of messages from a sender. In one or more embodiments, the act 776 may involve receiving, from a sender, a plurality of messages, each message of the plurality of messages being sent to at least one recipient of a plurality of recipients. Each message of the plurality of messages may be sent to at least one recipient of a plurality of recipients.

The series of acts 774 may further include an act 778 of determining a message frequency of the sender based on the plurality of messages. In one or more embodiments, the act 778 may involve determining a message frequency of the sender based on the plurality of messages, the message frequency including a quantity of messages sent to a given recipient from the plurality of recipients over a period of time. The message frequency may be determined based on a quantity of messages sent to a unique recipient (e.g., from a pool of subscribed recipients) over a period of time.

The series of acts 774 may include an act 780 of transmitting a message and an associated frequency indicator to a target recipient. In one or more embodiments, the act 780 may involve transmitting a message to a target recipient of the plurality of recipients, wherein transmitting the message includes providing a frequency indicator associated with the determined message frequency of the sender. The target recipient may be the intended recipient of the message. For example, the target recipient may be the person in the to:, cc:, and/or bcc: line of an email message. The noise management system may provide a frequency indicator of the message frequency. The noise management system may transmit the message as a new message to the target recipient. In some embodiments, the noise management system may provide a frequency indicator of the message frequency with the message.

In one or more embodiments, the sender includes a plurality of sender addresses associated with a related domain. In one or more embodiments, determining the message frequency includes identifying a quantity of the plurality of messages sent by the sender, the quantity of the plurality of messages being determined based on a number of the plurality of messages delivered to respective recipients from the plurality of recipients.

In one or more embodiments, the series of acts 774 includes determining a noise rank of the sender based on the message frequency, and wherein transmitting the message includes providing an indication of the noise rank via a presentation of the message on a client device of the target recipient. In one or more embodiments, the at least one recipient includes a subset of recipients from the plurality of recipients. In addition, determining the message frequency may include determining a running average of messages per recipient delivered to each recipient from the subset of recipients over the period of time.

In one or more embodiments, the series of acts 774 includes receiving, from the recipient, an indication of a threshold noise frequency indicating a preference to selectively receive messages below the threshold noise frequency. The series of acts 774 may further include selectively delivering subsequent messages from the sender based on a determination that the message frequency of the sender is below the threshold noise frequency.

In one or more embodiments, determining the message frequency includes categorizing the plurality of messages into a plurality of message categories. Determining the message frequency may further include determining, for each category from the plurality of message categories, a category frequency associated with quantities of messages from the sender being categorized into respective message categories from the plurality of message categories over the period of time. In one or more embodiments, the plurality of message categories includes at least one of advertisements, shipping information, order confirmations, customer service, or message length.

In one or more embodiments, the series of acts 774 further includes receiving, from the target recipient, an indication of a threshold noise frequency indicating a preference to selectively receive messages from the sender having a category frequency below the threshold noise frequency. For each subsequent message from the sender addressed to the target recipient, the series of acts 774 may include determining a category of the subsequent message, comparing a category frequency of the category to the threshold noise frequency, delivering the subsequent message to the target recipient when the category frequency is below the threshold noise frequency, and causing the subsequent message to be filtered from delivery to the target recipient when the category frequency is not below the threshold noise frequency.

As mentioned, FIG. 8 illustrates a flowchart of a series of acts for managing messages in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

In FIG. 8, a series of acts 882 for managing messages includes an act 884 of receiving a message frequency rating associated with a sender. In one or more embodiments, the act 884 includes receiving a message frequency rating associated with a sender based on a determined quantity of messages sent by the sender to a plurality of recipients over a period of time.

The series of acts 882 may further include an act 886 of providing a message presentation including an interactive icon indicating the message frequency rating of the sender. In one or more embodiments, the series of acts 886 includes providing, via a graphical user interface (GUI) of a client device, a message presentation of a message from the sender, the message presentation including a display of at least a portion of the message and an interactive icon indicating the message frequency rating of the sender.

The series of acts 882 may include an act 888 of detecting a selection of the interactive icon. In one or more embodiments, the act 888 includes detecting a selection of the interactive icon indicating the message frequency rating.

The series of acts 882 may further include an act 890 of providing a presentation via a GUI based on the selection where the presentation includes one or more selectable options for selectively delivering messages from the sender. In one or more embodiments, the act 890 includes providing, via the GUI of the client device and in response to detecting the selection of the interactive icon, one or more selectable options associated with selectively delivering subsequent messages from the sender based on the message frequency rating associated with the sender.

In one or more embodiments, the message frequency rating includes a plurality of category frequencies associated with the sender with respect to different categories of messages transmitted by the sender to the plurality of recipients over the period of time. In one or more implementations, the message frequency rating includes a plurality of category frequencies associated with the sender with respect to different categories of messages transmitted by the sender to the plurality of recipients over the period of time. In one or more embodiments, the different categories of messages include at least one of at least one of advertisements, shipping information, order confirmations, customer service, or message length.

In one or more embodiments, the one or more selectable options include a first selectable option corresponding to a first category of messages and associated with a first category frequency from the plurality of category frequencies, and a second selectable option corresponding to a second category of messages and associated with a second category frequency from the plurality of category frequencies. In one or more implementations, the series of acts 882 includes detecting a selection of the first selectable option corresponding to the first category of message. The series of acts 882 may further include, based on the selection of the first selectable option, filtering subsequent messages received from the sender that are determined to belong to the first category of messages. In one or more embodiments, a display of the interactive icon is provided within the message presentation when the message is opened by the recipient.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
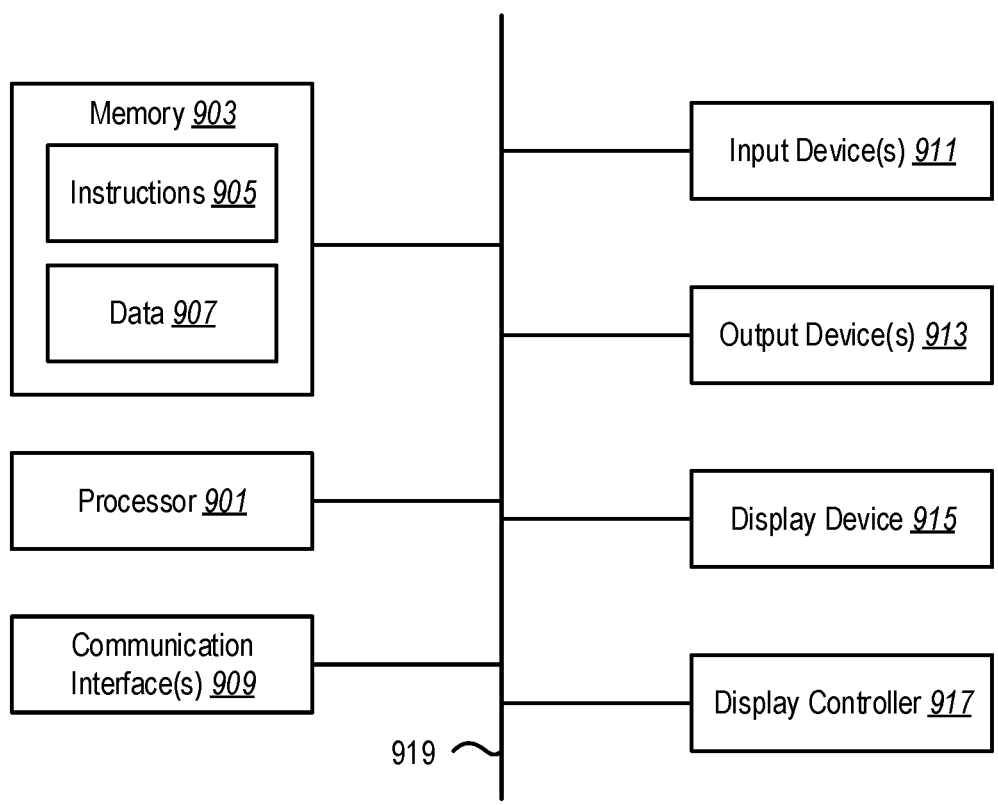
FIG. 9 is a representation of a computing system, according to at least one embodiment of the present disclosure.

FIG. 9 illustrates certain components that may be included within a computer system 919. One or more computer systems 919 may be used to implement the various devices, components, and systems described herein.

The computer system 919 includes a processor 901. The processor 901 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 901 may be referred to as a central processing unit (CPU). Although just a single processor 901 is shown in the computer system 919 of FIG. 9, in an alternative configuration, a combination of processors (e.g., an ARM and DSP) could be used.

The computer system 919 also includes memory 903 in electronic communication with the processor 901. The memory 903 may be any electronic component capable of storing electronic information. For example, the memory 903 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 905 and data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during execution of the instructions 905 by the processor 901.

A computer system 919 may also include one or more communication interfaces 909 for communicating with other electronic devices. The communication interface(s) 909 may be based on wired communication technology, wireless communication technology, or both. Some examples of communication interfaces 909 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 919 may also include one or more input devices 911 and one or more output devices 913. Some examples of input devices 911 include a keyboard, mouse, microphone, remote control device, button, joystick, trackball, touchpad, and lightpen. Some examples of output devices 913 include a speaker and a printer. One specific type of output device that is typically included in a computer system 919 is a display device 915. Display devices 915 used with embodiments disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 919 may be coupled together by one or more buses, which may include a power bus, a control signal bus, a status signal bus, a data bus, etc. For the sake of clarity, the various buses are illustrated in FIG. 9 as a bus system 919.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for indicating a noise level associated with a message sender, the method comprising:
receiving, from a sender, a plurality of messages, each message of the plurality of messages being sent to at least one recipient of a plurality of recipients;
determining a message frequency of the sender based on the plurality of messages, the message frequency including a quantity of messages sent to a given recipient of the plurality of recipients over a period of time;
comparing the message frequency to a plurality of threshold values associated with a plurality of noise ranks, each noise rank being based on a range of frequencies defined by the plurality of threshold values;
determining a noise rank of the sender from the plurality of noise ranks based on the comparing the message frequency to the plurality of threshold values; and transmitting a message to a target recipient of the plurality of recipients, wherein transmitting the message includes providing a frequency indicator associated with the determined noise rank from the plurality of noise ranks.

2. The method of claim 1, wherein the sender is associated with a plurality of sender addresses associated with a related domain.

3. The method of claim 1, wherein determining the message frequency includes identifying a quantity of the plurality of messages sent by the sender, the quantity of the plurality of messages being determined based on a number of the plurality of messages delivered to respective recipients of the plurality of recipients.

4. The method of claim 1, wherein transmitting the message includes providing an indication of the noise rank via a presentation of the message on a client device of the target recipient.

5. The method of claim 1, wherein each noise rank of the plurality of noise ranks is associated with an associated range of threshold values from the plurality of threshold values.

6. The method of claim 1, wherein the at least one recipient includes a subset of recipients of the plurality of recipients, and wherein determining the message frequency includes determining a running average of messages per recipient delivered to each recipient of the subset of recipients over the period of time.

7. The method of claim 1, further comprising:
receiving, from the recipient, an indication of a threshold noise rank indicating a preference to selectively receive messages below the threshold noise rank; and
selectively delivering subsequent messages from the sender based on a determination that the noise rank of the sender is below the threshold noise rank.

8. The method of claim 1, wherein determining the message frequency includes:
categorizing the plurality of messages into a plurality of message categories; and
determining, for each category of the plurality of message categories, a category frequency associated with quantities of messages from the sender being categorized into respective message categories of the plurality of message categories over the period of time.

9. The method of claim 8, wherein the plurality of message categories includes at least one of advertisements, shipping information, order confirmations, customer service, or message length.

10. The method of claim 8, further comprising:
receiving, from the target recipient, an indication of a threshold noise rank indicating a preference to selectively receive messages from the sender having a category frequency below the threshold noise rank; and
for each subsequent message from the sender addressed to the target recipient;
determining a category of the subsequent message;
comparing a category frequency of the category to a message frequency associated with the threshold noise rank;
delivering the subsequent message to the target recipient when the category frequency is below the message frequency associated with the threshold noise rank; and
causing the subsequent message to be filtered from delivery to the target recipient when the category frequency is not below the message frequency associated with the threshold noise rank.

11. A system, comprising:
at least one processor;
memory in electronic communication with the at least one processor; and
instructions stored in the memory, the instructions being executable by the at least one processor to:
receive, from a sender, a plurality of messages, each message of the plurality of messages being sent to at least one recipient of a plurality of recipients;
determine a message frequency of the sender based on the plurality of messages, the message frequency including a quantity of messages sent to a given recipient of the plurality of recipients over a period of time;
compare the message frequency to a plurality of threshold values associated with a plurality of noise ranks, each noise rank being based on a range of frequencies defined by the plurality of threshold values;
determine a noise rank of the sender from the plurality of noise ranks based on the comparing the message frequency to the plurality of threshold values; and
transmit a message to a target recipient of the plurality of recipients, wherein transmitting the message includes providing a frequency indicator associated with the determined noise rank from the plurality of noise ranks.

12. The system of claim 11, wherein determining the message frequency includes identifying a quantity of the plurality of messages sent by the sender, the quantity of the plurality of messages being determined based on a number of the plurality of messages delivered to respective recipients of the plurality of recipients.

13. The system of claim 11, wherein transmitting the message includes providing an indication of the noise rank via a presentation of the message on a client device of the target recipient.

14. The system of claim 11, wherein determining the message frequency includes:
categorizing the plurality of messages into a plurality of message categories; and
determining, for each category of the plurality of message categories, a category frequency associated with quantities of messages from the sender being categorized into respective message categories of the plurality of message categories over the period of time.

15. The system of claim 11, wherein the sender is associated with a plurality of sender addresses associated with a related domain.

16. The system of claim 11, wherein the at least one recipient includes a subset of recipients of the plurality of recipients, and wherein determining the message frequency includes determining a running average of messages per recipient delivered to each recipient of the subset of recipients over the period of time.

17. The system of claim 11, wherein the instructions further cause the at least one processor to:
receive, from the recipient, an indication of a threshold noise rank indicating a preference to selectively receive messages below the threshold noise rank; and
selectively deliver subsequent messages from the sender based on a determination that the noise rank of the sender is below the threshold noise rank.

18. The system of claim 11, wherein the instructions further cause the at least one processor to:
receive, from the target recipient, an indication of a threshold noise rank indicating a preference to selectively receive messages from the sender having a category frequency below the threshold noise rank; and for each subsequent message from the sender addressed to the target recipient:
- determining a category of the subsequent message;
- comparing a category frequency of the category to a message frequency associated with the threshold noise rank;
- delivering the subsequent message to the target recipient when the category frequency is below the message frequency associated with the threshold noise rank; and
- causing the subsequent message to be filtered from delivery to the target recipient when the category frequency is not below the message frequency associated with the threshold noise rank.

19. A non-transitory computer readable storage medium storing instructions thereon that, when executed by at least one processor, causes a computing device to:
- receive, from a sender, a plurality of messages, each message of the plurality of messages being sent to at least one recipient of a plurality of recipients;
- determine a message frequency of the sender based on the plurality of messages, the message frequency including a quantity of messages sent to a given recipient of the plurality of recipients over a period of time;
- compare the message frequency to a plurality of threshold values associated with a plurality of noise ranks, each noise rank being based on a range of frequencies defined by the plurality of threshold values;
- determine a noise rank of the sender from the plurality of noise ranks based on the comparing the message frequency to the plurality of threshold values; and
- transmit a message to a target recipient of the plurality of recipients, wherein transmitting the message includes providing a frequency indicator associated with the determined noise rank from the plurality of noise ranks.

20. The non-transitory computer readable medium of claim 19, wherein determining the message frequency includes identifying a quantity of the plurality of messages sent by the sender, the quantity of the plurality of messages being determined based on a number of the plurality of messages delivered to respective recipients of the plurality of recipients.

* * * * *